(12) United States Patent
Hiramoto et al.

(10) Patent No.: US 8,710,832 B2
(45) Date of Patent: Apr. 29, 2014

(54) ROTATION ANGLE SENSOR

(75) Inventors: Satoru Hiramoto, Nagoya (JP);
Yoshiyuki Kono, Obu (JP); Akitoshi Mizutani, Okazaki (JP); Takamitsu Kubota, Chiryu (JP); Atsushi Tanaka, Anjo (JP); Takehito Mizunuma, Chiryu (JP)

(73) Assignee: Denso Corporation, Kariya (JP)

( * ) Notice: Subject to any disclaimer, the term of this patent is extended or adjusted under 35 U.S.C. 154(b) by 196 days.

(21) Appl. No.: 13/444,196

(22) Filed: Apr. 11, 2012

(65) Prior Publication Data

US 2012/0268111 A1 Oct. 25, 2012

(30) Foreign Application Priority Data

Apr. 22, 2011 (JP) .................................. 2011-96142
Jan. 27, 2012 (JP) .................................. 2012-14915

(51) Int. Cl.
*G01B 7/30* (2006.01)

(52) U.S. Cl.
USPC .................................. 324/207.25; 324/207.2

(58) Field of Classification Search
USPC .......................... 324/173–174, 207.2–207.25
See application file for complete search history.

(56) References Cited

U.S. PATENT DOCUMENTS

| 6,407,543 | B1 | | 6/2002 | Hagio et al. | |
| 6,483,296 | B1 | * | 11/2002 | Hamaoka et al. | 324/207.25 |
| 6,756,780 | B2 | * | 6/2004 | Hagio et al. | 324/207.25 |
| 7,323,866 | B1 | * | 1/2008 | Uryu et al. | 324/207.25 |
| 7,583,078 | B2 | * | 9/2009 | Kubota et al. | 324/207.2 |
| 8,479,707 | B2 | * | 7/2013 | Mase | 123/399 |
| 2001/0003421 | A1 | * | 6/2001 | Kubota et al. | 324/207.2 |
| 2004/0135574 | A1 | * | 7/2004 | Hagio et al. | 324/207.25 |
| 2005/0073299 | A1 | * | 4/2005 | Yoshikawa et al. | 324/207.25 |
| 2007/0247143 | A1 | * | 10/2007 | Ikeda et al. | 324/207.25 |
| 2008/0012555 | A1 | * | 1/2008 | Ikeda | 324/207.25 |
| 2011/0094474 | A1 | * | 4/2011 | Ikeda et al. | 123/403 |
| 2011/0260719 | A1 | * | 10/2011 | Mase et al. | 324/207.25 |
| 2012/0032670 | A1 | * | 2/2012 | Ikeda et al. | 324/207.25 |

FOREIGN PATENT DOCUMENTS

| JP | 7-181192 | 7/1995 |
| JP | 10-197209 | 7/1998 |
| JP | 2000-292112 | 10/2000 |
| JP | 2002-286498 | 10/2002 |
| JP | 2004-233280 | 8/2004 |
| JP | 2007-327860 | 12/2007 |

OTHER PUBLICATIONS

Office Action (2 pages) dated Apr. 12, 2013, issued in corresponding Japanese Application No. 2012-0149515 and English translation (3 pages).

* cited by examiner

*Primary Examiner* — Jay Patidar
(74) *Attorney, Agent, or Firm* — Nixon & Vanderhye P.C.

(57) ABSTRACT

A rotation angle sensor includes a housing, a detected object, a magnetism generation section, a housing cover, a circuit substrate, a sensing IC, and a resin body. The sensing IC includes a magnetism detection element, a molded body, and leads. The magnetism detection element outputs a signal in accordance with a change in a magnetic field due to a rotation of the detected object. The molded body covers the magnetism detection element. One end portion of each lead is electrically coupled with the magnetism detection element and the other end portion of each lead protrudes from the molded body and is electrically coupled with the circuit substrate. The resin body seals a portion of the molded body located between the magnetism detection element and the housing cover, the leads, and the circuit substrate.

14 Claims, 12 Drawing Sheets

ROTATION ANGLE SENSOR

CROSS REFERENCE TO RELATED APPLICATIONS

The present application is based on and claims priority to Japanese Patent Applications No. 2011-96142 filed on Apr. 22, 2011 and No. 2012-14915 filed on Jan. 27, 2012, the contents of which are incorporated in their entirety herein by reference.

TECHNICAL FIELD

The present disclosure relates to a rotation angle sensor that detects a rotation angle of a detected object.

BACKGROUND

A conventional rotation angle sensor detects a rotation angle of a detected object using a sensing integrated circuit (IC) that outputs a signal in accordance with a change in magnetic field. The sensing IC includes a magnetism detection element, leads, and a resin molded body that seals the magnetism detection element and the leads.

In a rotation angle sensor disclosed in JP-A-2004-4114 (corresponding to U.S. Pat. No. 6,407,543), a magnet is attached to one side of an axial direction of a detected object that is rotatably held by a housing. In addition, a housing cover made of resin is attached to a side of the housing adjacent to the magnet. A sensing IC that outputs a signal in accordance with a change in a magnetic field due to a rotation of the detected object is sealed with the housing cover, which is molded, and is fixed to the housing cover. Accordingly, the sensing IC is accurately positioned with respect to the detected object.

SUMMARY

It is an object of the present disclosure to provide a rotation angle sensor that can have a high detection accuracy.

According an aspect of the present disclosure, a rotation angle sensor includes a housing, a detected object, a magnetism generation section, a housing cover, a circuit substrate, a sensing IC, and a resin body. The detected object is rotatably held by the housing. The magnetism generation section is provided to the detected body and is configured to generate a magnetic field whose magnetic flux flows perpendicularly to a rotation axis of the detected object. The housing cover is attached to a side of the housing adjacent to the magnetism generation section. The circuit substrate is attached to the housing cover. The sensing IC includes a magnetism detection element, a molded body, and a plurality of leads. The magnetism detection element is configured to output a signal in accordance with a change in the magnetic field due to a rotation of the detected object. The molded body covers the magnetism detection element. One end portion of each of the leads is electrically coupled with the magnetism detection element and the other end portion of each of the leads protrudes from the molded body and is electrically coupled with the circuit substrate. The resin body seals a portion of the molded body located between the magnetism detection element and the housing cover, the leads, and the circuit substrate.

The rotation angle sensor can have stable temperature characteristics and can have a high detection accuracy.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Inventors of the present disclosure have found the following. In general, a thermal expansion coefficient of a molded body of a sensing IC is different from a thermal expansion coefficient of a housing cover. Thus, in the rotation angle sensor disclosed in JP-A-2004-4114, the magnetism detection element is applied with stress due to a change in temperature of the rotation angle sensor, and temperature characteristics of signals output from the magnetism detection element may be deteriorated. In addition, when the housing cover and the sensing IC are formed by resin molding, the magnetism detection element is applied with a forming stress. Thus, after the resin molding, an inspection for checking whether the magnetism detection element is damaged is necessary and a manufacturing cost increases. In view of the foregoing, an object of the present disclosure is to provide a rotation angle sensor having high detection accuracy.

First Embodiment

Figure 1:
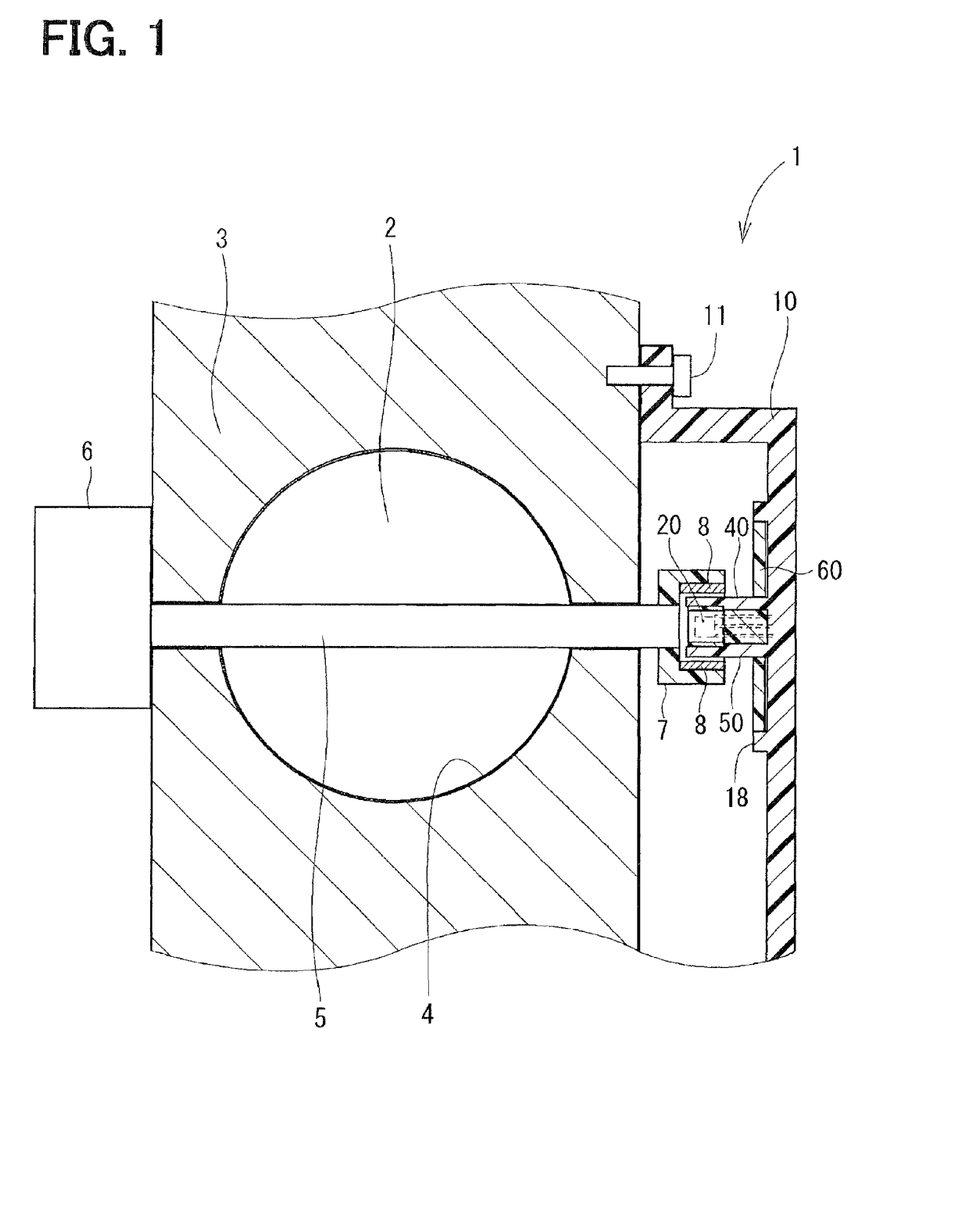
FIG. 1 is across-sectional view of a rotation angle sensor according to a first embodiment of the present disclosure.
Figure 2:
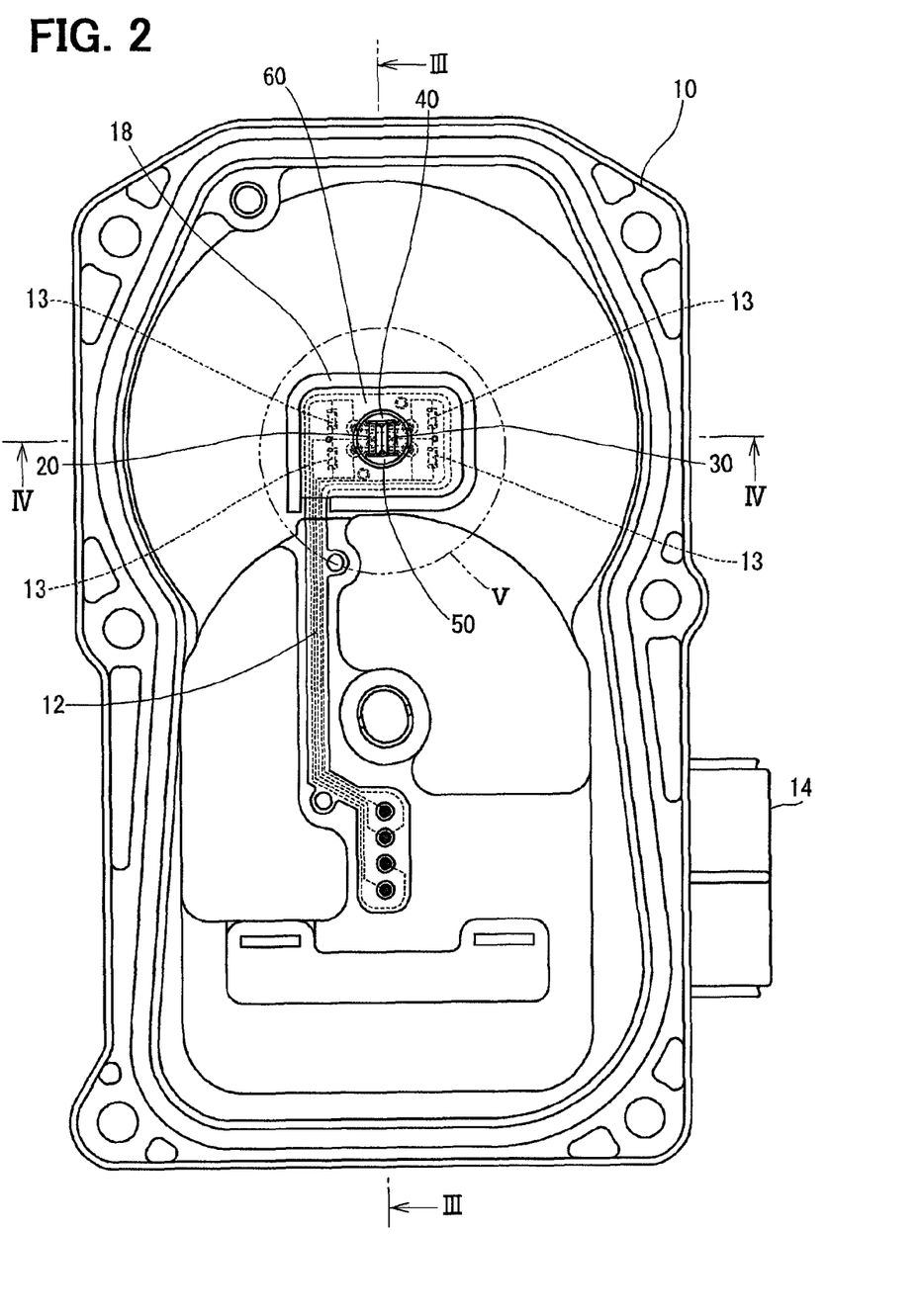
FIG. 2 is plan view of a housing cover of the rotation angle sensor according to the first embodiment.
Figure 3:
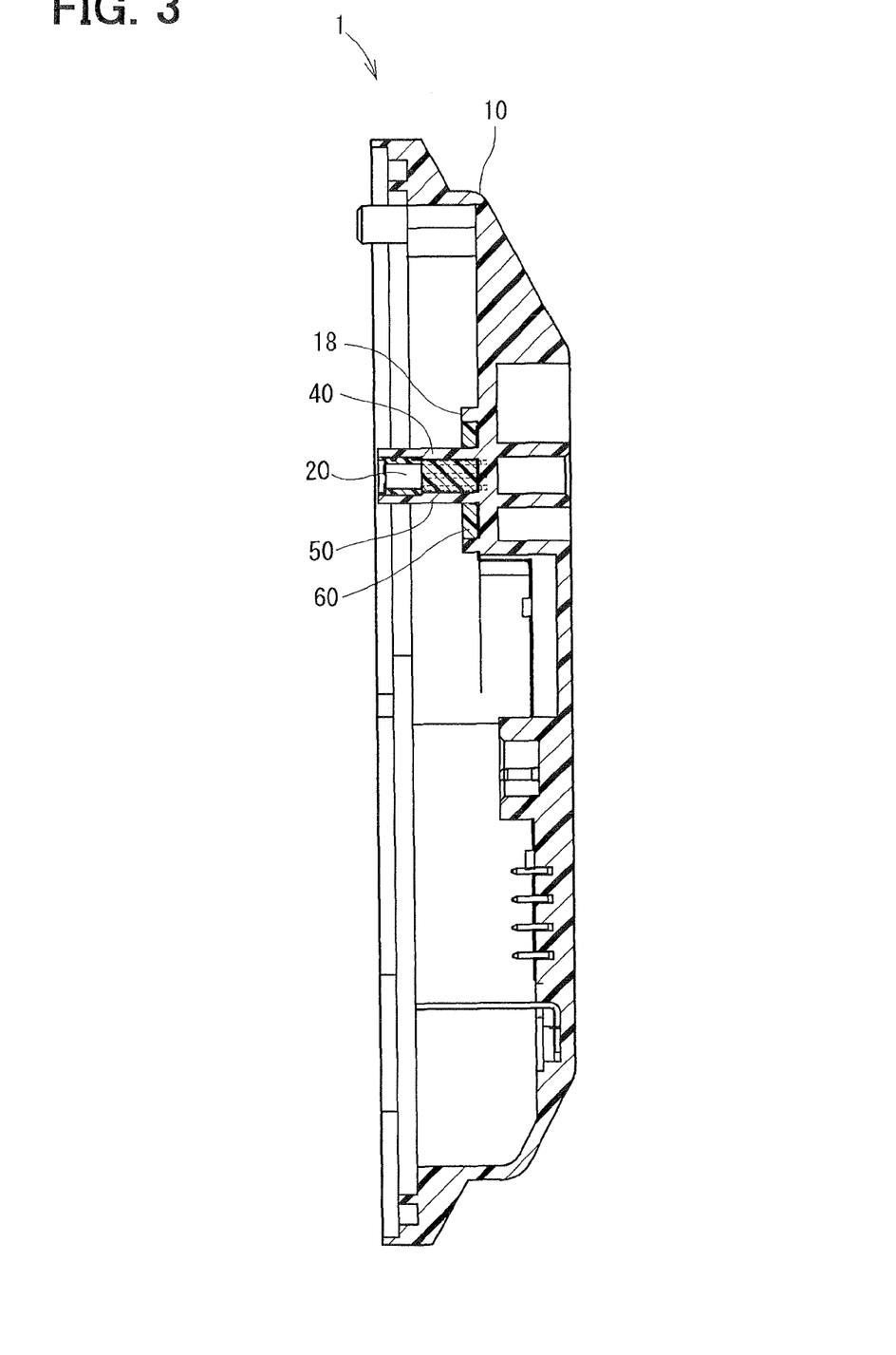
FIG. 3 is a cross-sectional view of the housing cover taken along line III-III in FIG. 2.
Figure 4:
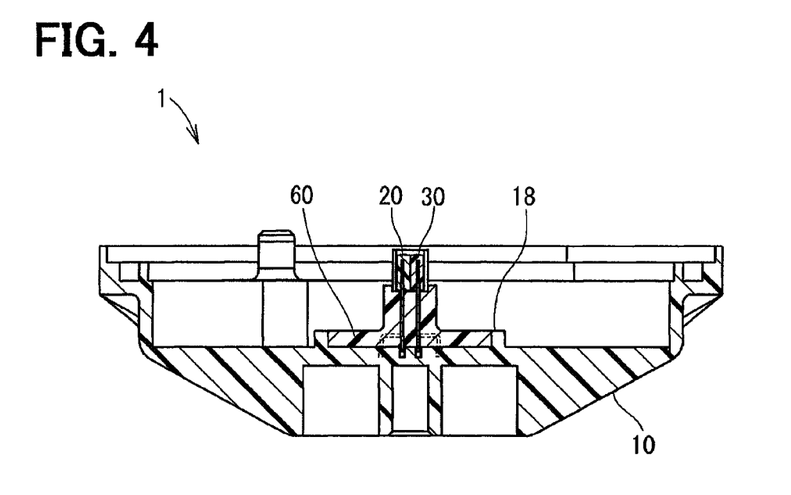
FIG. 4 is a cross-sectional view of the housing cover taken along line IV-IV in FIG. 2
Figure 5:
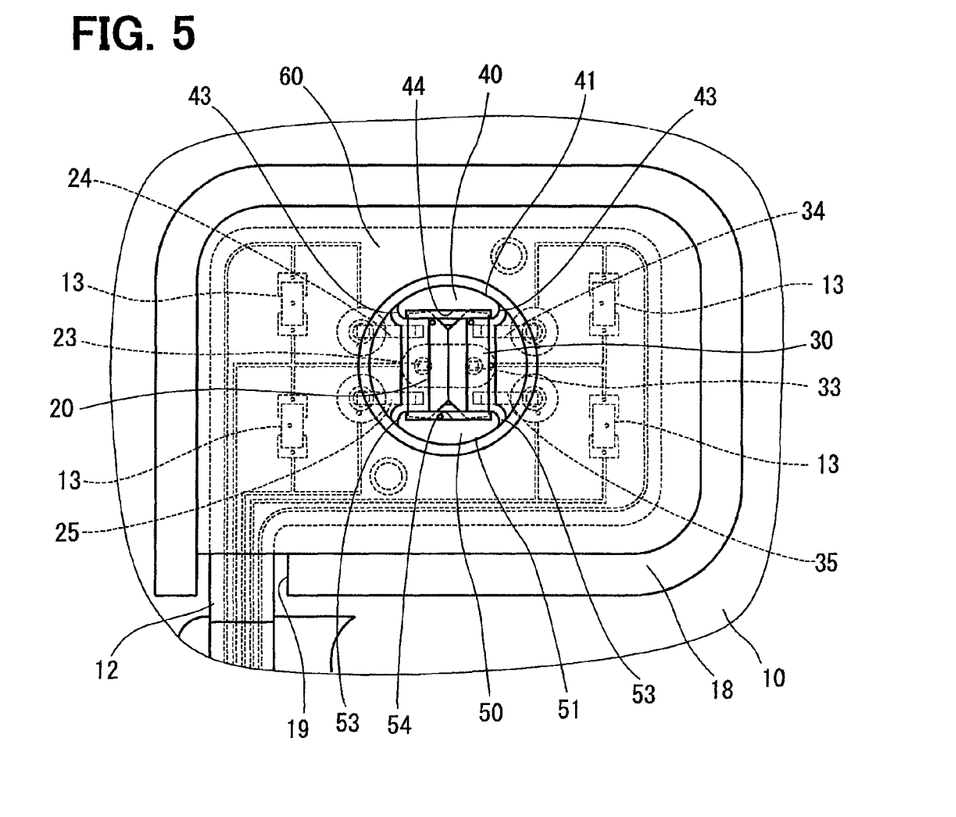
FIG. 5 is an enlarged view of a portion V of the rotation angle sensor shown in FIG. 2.
Figure 6:
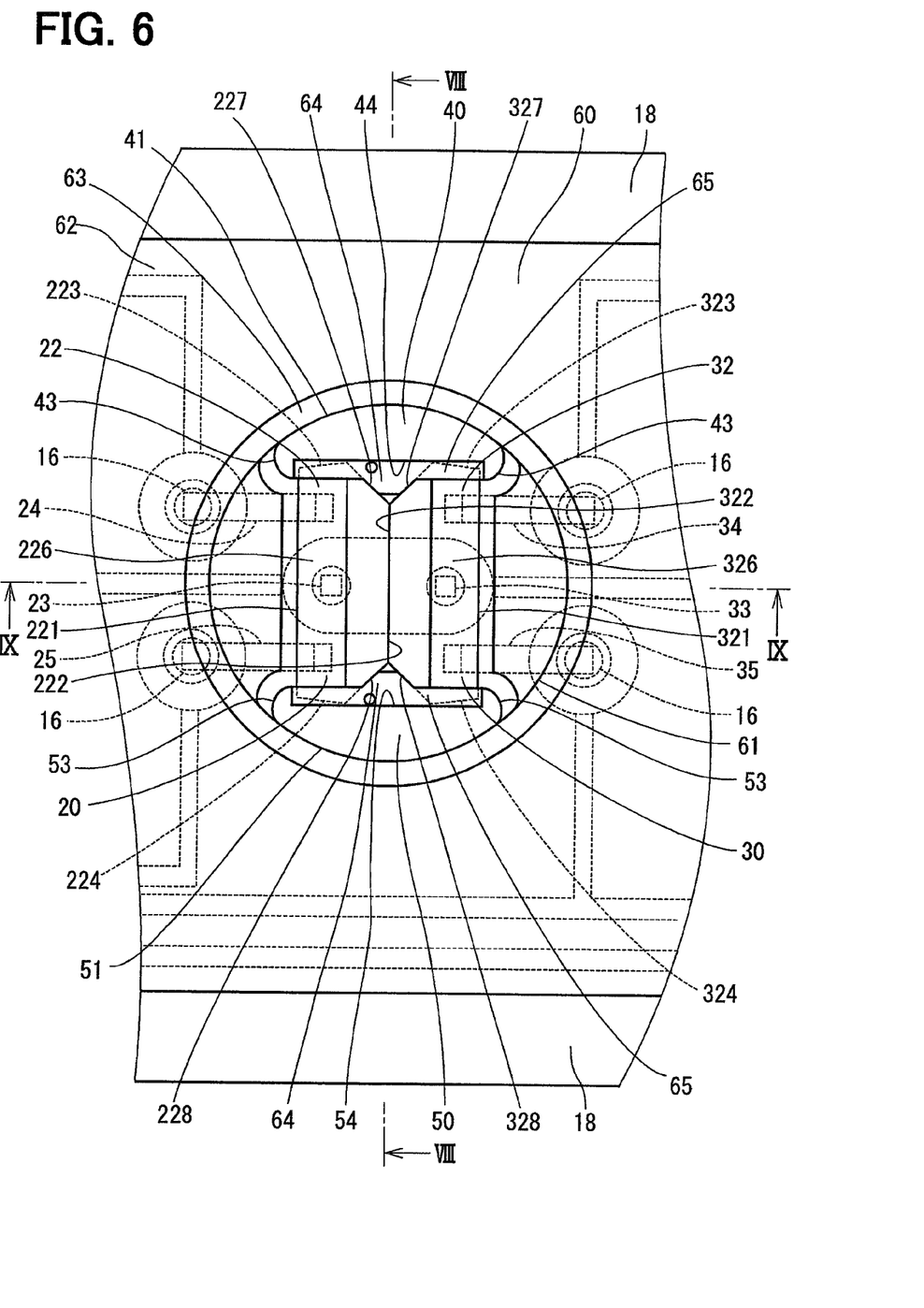
FIG. 6 is an enlarged view of a portion of the rotation angle sensor shown in FIG. 5.

A rotation angle sensor 1 according to a first embodiment of the present disclosure will be described with reference to FIG. 1 to FIG. 11. The rotation angle sensor 1 detects a rotation angle of a throttle valve 2 as a detected object. A signal output from the rotation angle sensor 1 is transmitted to an electronic control unit (ECU), which is not shown, disposed in a vehicle. The ECU controls each part of an internal combustion engine. As shown in FIG. 1, a housing 3 defines a suction passage 4 through which air is introduced into the internal combustion engine. The throttle valve 2 has an approximately circular plate shape and is disposed in the suction passage. The throttle value 2 is integrated with a valve shaft 5. Two ends of the valve shaft 5 are rotatably held by the housing 3. Accordingly, the throttle valve 2 is rotatable with the valve shaft 5 as a rotation axis. One end of the valve shaft 5 is attached with a motor 6. The motor 6 is driven by instructions from the ECU. By driving the motor 6, an opening degree of the throttle valve 2 is controlled and the amount of suctioned air supplied to the internal combustion engine is also controlled.

The other end of the valve shaft 5 is attached with a holder 7 having a bottomed cylindrical shape. On a radial inside of the holder 7, two magnets 8 and two yokes are disposed. The magnets 8 can work as magnetism generation sections. The yokes couple the magnets 8 in a circumferential direction. The two magnets 8 are disposed to opposite sides of the rotational axis of the throttle valve 2 in a radial direction. The two magnets 8 provide a magnetic flux of N pole to one of the yoke and provide a magnetic flux of S pole to the other yoke. Accordingly, a magnetic field whose magnetic flux flows in a direction approximately perpendicular to the rotation axis of the throttle value 2 is generated. When the throttle value 2 rotates, a direction of the magnetic filed inside the holder 7 changes.

A side of the housing 3 adjacent to the holder 7 is attached with a housing cover 10. As shown in FIG. 1 to FIG. 4, the housing cover 10 is made of resin and has a dish shape. The housing cover 10 is fixed to the housing 3 with a fixing member, such as a screw 11. The housing cover 10 is attached with a circuit substrate 12. For example, the circuit substrate 12 is a flexible substrate and is attached to an inner wall of the housing cover 10 with adhesive agent and the like. On the circuit substrate 12, electronic components including a capacitor 13 is mounted. Wirings of the circuit substrate 12 are electrically coupled with a terminal of a connector 14 attached to the housing cover 10.

The rotation angle sensor includes a sensing IC. As shown in FIG. 5 to FIG. 9, the sensing IC includes a first sensing IC 20 and the second sensing IC 30. The first sensing IC 20 and the second sensing IC 30 have substantially similar structures. The sensing IC 20 includes a magnetism detection element 21, a molded body 22, and a plurality of leads 23, 24, 25. The magnetism detection element 21 is a magnetic sensor in which an element, such as Hall element or a magnetic resistance (MR) element, and a signal amplifying circuit are integrated. The magnetism detection element 21 outputs a voltage signal in accordance with magnetic flux passing through the magnetism detection element 21. When a density of the magnetic flux passing through the magnetism detection element 21 changes with a rotation of the throttle valve 2, the voltage signal output from the magnetism detection element 21 also changes.

The molded body 22 is made of resin and covers the magnetism detection element 21. The molded body 22 protects the magnetism detection element 21 against impact, heat, humidity and the like. The molded body 22 has a rectangular parallelepiped shape. In the present disclosure, the rectangular parallelepiped shape includes an approximately rectangular parallelepiped shape. The molded body 22 has a front surface 221, a rear surface 222, two side surfaces 223, 224, a lower surface 225, and an upper surface 226. The molded body 22 further includes two chamfered portions 227, 228 between the rear surface 222 and the two side surfaces 223, 224. The magnetism detection element 21 is buried in the molded body 22 in parallel with the front surface 221 and the rear surface 222.

The leads are made of metal and include a first lead 23 and two second leads 24, 25 disposed on opposite sides of the first lead 23. The first lead 23 is disposed perpendicularly to the inner wall of the housing cover 10. On end portion of the first lead 23 is electrically coupled with the magnetism detection element 21, and the other end portion of the first lead 23 protrudes from the molded body 22. The other end portion of the first lead 23 passes through a through hole 16 defined between a first pillar 40 and a second pillar 50 by the circuit substrate 12 and is inserted into a hole 15 defined by the housing cover 10. The other end portion of the first lead 23 is electrically coupled with the through hole 16 via a solder and the like.

In each of the second leads 24, 25, one end portion is electrically coupled with the magnetism detection element 21 and the other end portion protrudes from the molded body 22. The second leads 24, 25 are curved at positions between an upper surface of a surrounding wall 18 and the housing cover 10 and extend toward the outsides of the first pillar 40 and the second pillar 50. The second leads 24, 25 are further curved and extends perpendicularly to the inner wall of the housing cover 10. The other end portion of each of the second leads 24, 25 passes through a through hole 16 defined between the first pillar 40 and the second pillar 50 by the circuit substrate 12 and is inserted into a hole 15 defined by the housing cover 10. The other end portion of each of the second leads 24, 25 is electrically coupled with the through hole 16 via a solder and the like.

Similarly to the first sensing IC 20, the second sensing IC 30 includes a magnetism detection element 31, a molded body 32, and a plurality of leads. The molded body 32 has a rectangular parallelepiped shape. The molded body 32 includes a front surface 321, a rear surface 32, two side surfaces 323, 324, a lower surface 325, an upper surface 326, and two chamfered portions 327, 328. The leads include a first lead 33 and two second leads 34, 35 disposed to opposite sides of the first lead 33.

The first pillar 40 extends perpendicularly to the inner wall of the housing cover 10 from the housing cover 10 toward the throttle valve 2. The second pillar 50 also extends perpendicularly to the inner wall of the housing cover 10 from the housing cover 10 toward the throttle valve 2. The first pillar 40 and the second pillar 50 have substantially similar structures. The first pillar 40, the second pillar 50, and the housing cover 10 are integrally formed with resin. The first pillar 40 and the second pillar 50 are disposed at the radial inside of the magnets 8 and the yokes and are disposed to opposite sides of the rotation axis of the throttle valve 2 (see FIG. 1).

The first pillar 40 will be described. The first pillar 40 includes an inner wall 42 and an outer wall 41. The outer wall 41 has a shape of an arc centering on the rotation axis of the throttle valve 2. The inner wall 42 has a plane shape parallel to a chord of the arc of the outer wall 41. The first pillar 40 further includes two curved portions 43 between the outer wall 41 and the inner wall 42. Each of the curved portions 43 has a radius of curvature smaller than a radius of curvature of the outer wall 41. The first pillar 40 defines a first depression 44 at a predetermined distance from the inner wall of the housing cover 10. The first depression 44 is depressed radially-outward of the rotation axis of the throttle valve 2. A distance between a bottom surface of the first depression 44 and the inner wall of the housing cover 10 corresponds to lengths of the leads 23, 24, 25 protruding from the molded body 22. A distance between the bottom surface of the first depression 44 and an upper surface of the first pillar 40 adjacent to the throttle valve 2 is longer than the molded body 22. Between the upper surface of the first pillar 40 adjacent to the throttle valve 2 and the molded body 22, stopper portions 65 are disposed.

Similarly to the first pillar 40, the second pillar 50 includes an outer wall 51 and an inner wall 52. The outer wall 51 has a shape of an arc centering on the rotation axis of the throttle valve 2. The inner wall 52 has a plane shape parallel to a chord of the arc of the outer wall 51. The second pillar 50 further includes two curved portions 53 between the outer wall 41 and the inner wall 42. The second pillar 50 defines a second depression 54 that is depressed radially-outward of the rotation axis of the throttle valve 2.

Figure 7:
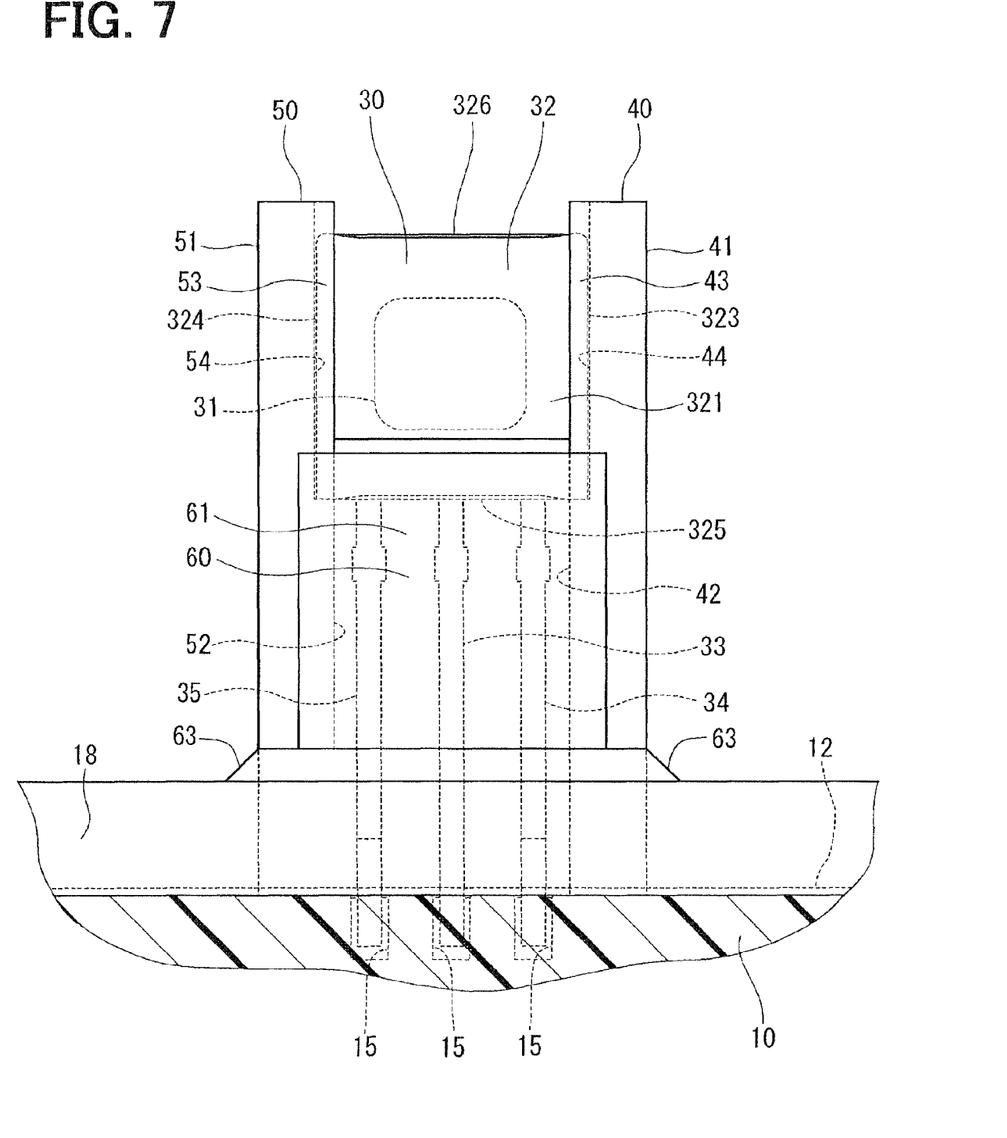
FIG. 7 is a side view of the portion of the rotation angle sensor shown in FIG. 6.
Figure 8:
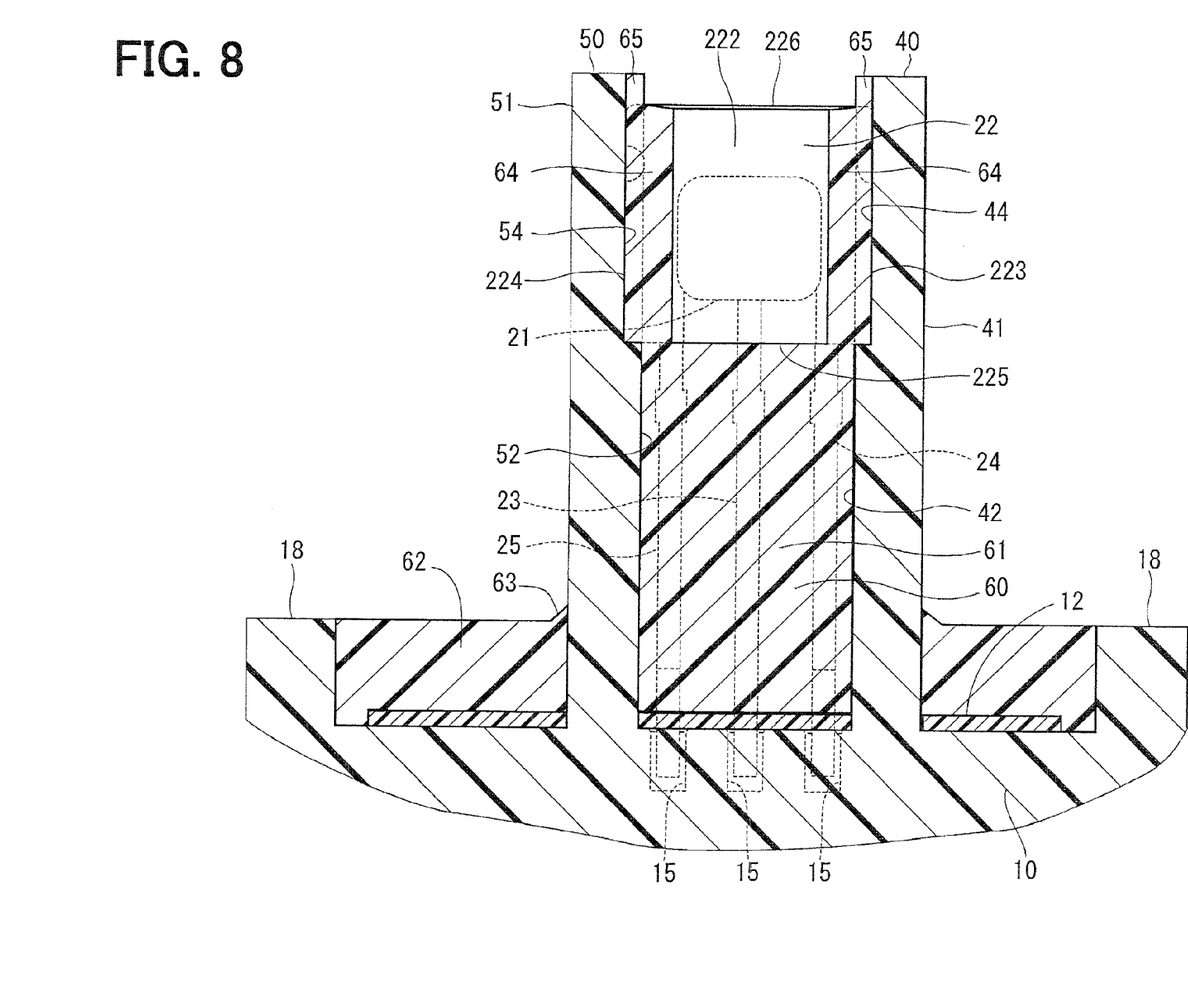
FIG. 8 is a cross-sectional view of the portion of the rotation angle sensor taken along line VIII-VIII in FIG. 6.
Figure 9:
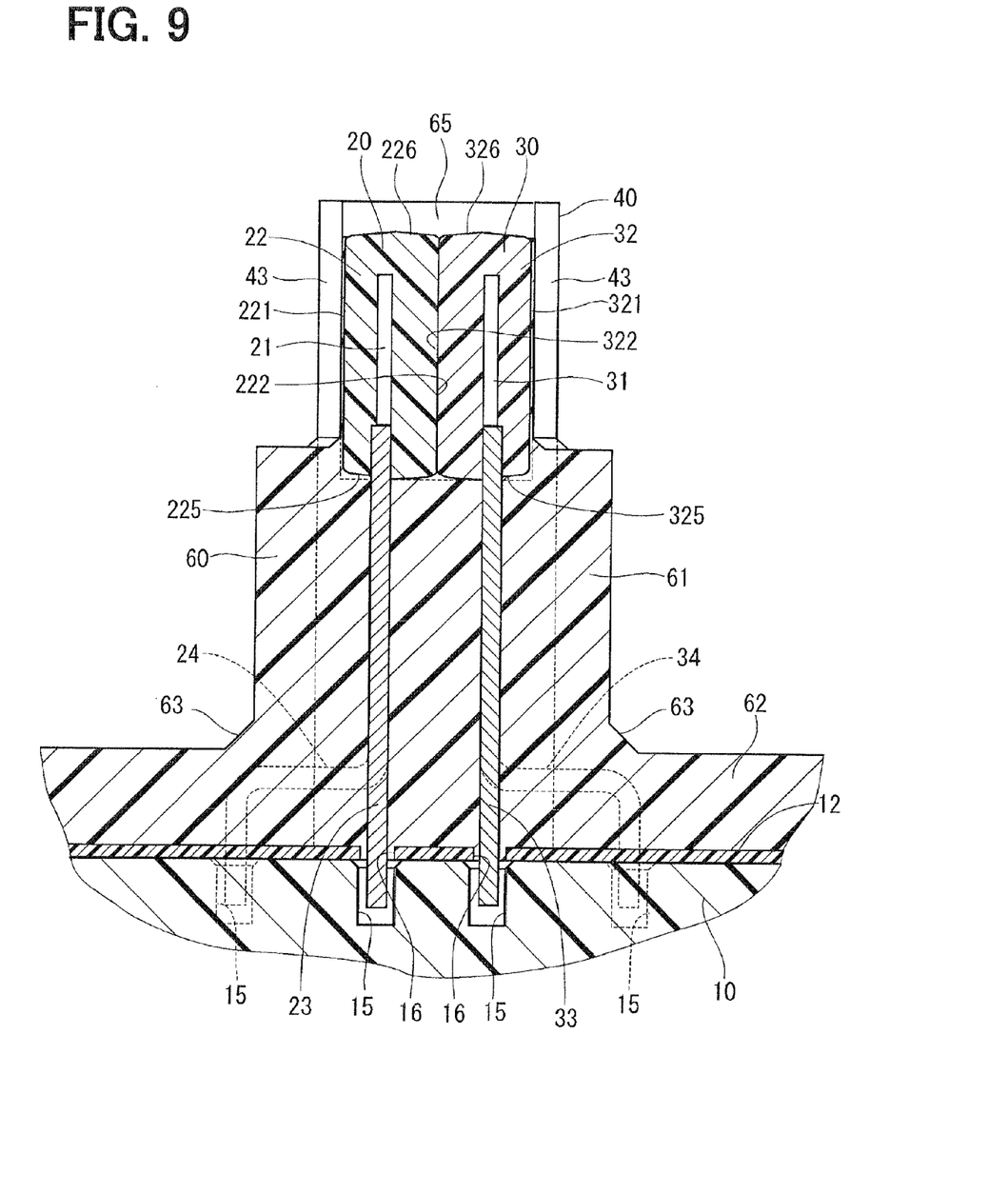
FIG. 9 is a cross-sectional view of the portion of the rotation angle sensor taken along line IX-IX in FIG. 6.

The first sensing IC 20 and the second sensing IC 30 are disposed in such a manner that the rear surface 222 of the molded body 22 is opposite the rear surface 322 of the molded body 32. The first depression 44 of the first pillar 40 locks a side of the first sensing IC 20 adjacent to the side surface 223 of the molded body 22 and a side of the second sensing IC 30 adjacent to the side surface 323 of the molded body 32 outside a position where the magnetism detection elements 21, 31 are buried. The second depression 54 of the second pillar 50 locks a side of the first sensing IC 20 adjacent to the other side surface 224 of the molded body 22 and a side of the second sensing IC 30 adjacent to the other side surface 324 of the molded body 32 outside the position where the magnetism detection elements 21, 31 are buried. The lower surface 225 of the molded body 22 of the first sensing IC 20 is locked by a bottom of the first depression 44 of the first pillar 40 and a bottom of the second depression 54 of the second pillar 50. The lower surface 325 of the molded body 32 of the second sensing IC 30 is also locked by the bottom of the first depression 44 of the first pillar 40 and the bottom of the second depression 54 of the second pillar 50. Accordingly, the molded body 22 of the first sensing IC 20 and the molded body 32 of the second sensing IC 30 are locked by an inner wall of the first depression 44 of the first pillar 40 and an inner wall of the second depression 54 of the second pillar 50. In FIG. 7 and FIG. 8, positions of the magnetism detection elements 21, 31 are buried in the molded body 22, 32 are shown by dashed lines.

The surrounding wall 18 is disposed outside the circuit substrate 12. The surrounding wall 18 extends from the inner wall of the housing cover 10 toward the throttle valve 2. The housing cover 10 and the surrounding wall 18 are integrally formed. The surrounding wall 18 defines an opening portion 19. The circuit substrate 12 extends in a direction from the first sensing IC 20 and the second sensing IC 30 toward the connector 14 through the opening portion 19 of the surrounding wall 18.

A resin body 60 is disposed inside the surrounding wall 18. The resin body 60 seals the circuit substrate 12, the first leads 23, 33, and the second leads 24, 25, 34, 35 disposed inside the surrounding wall 18 and the molded bodies 22, 32 except for the front surfaces 221, 321 and the rear surfaces 222, 322 corresponding to the positions where the magnetism detection elements 21, 31 are buried. The front surfaces 221, 321 and the rear surfaces 222, 322 of the molded bodies 22, 32 corresponding to the positions where the magnetism detection elements 21, 31 are buried are exposed from the resin body 60. In other words, portions of the molded bodies 22, 32 between the detection elements 21,31 and the housing cover 10 are sealed by the resin body 60.

The resin body 60 includes IC supporters 61 disposed on extension lines of the arcs of the outer wall 41 of the first pillar 40 and the outer wall 51 of the second pillar 50. Thus, the first pillar 40, the second pillar 50, and the resin body 60 defines a circular column shape between the position where the magnetism detection element 21 is buried and the housing cover 10. The resin body 60 further includes a circuit sealing portion 62 inside the surrounding wall 18. An upper surface of the circuit sealing portion 62 and an upper surface of the surrounding wall 18 are located at similar height. The resin body 60 further includes taper portions 63 at connection portions of the circuit sealing portion 62 and the IC supporters 61. The resin body 60 further includes the stopper portions 65. The stopper portions 65 are disposed in the first depression 44 of the first pillar 40 and the second depression 54 of the second pillar 50 and seal the upper surfaces of the molded bodies 22, 32. Furthermore, the resin body 60 includes coupling portions 64 sealed between the chamfered portions 227, 228 of the first sensing IC 20 and the chamfered portions 327, 328 of the second sensing IC 30. The coupling portions 64 couple the IC supporters 61 and the stopper portions 65.

A manufacturing method of the rotation angle sensor 1 will be described. Firstly, the housing cover 10, the first pillar 40, the second pillar 50, and the surrounding wall 18 are integrally formed of resin. The circuit substrate 12 is attached to the inner wall of the housing cover 10. The circuit substrate 12 is applied with solder paste (not shown). Next, the molded bodies 22, 32 of the first sensing IC 20 and the second sensing IC 30 are inserted into the first depression 44 of the first pillar 40 and the second depression 54 of the second pillar 50. At this time, the first leads 23, 33 and the second leads 24, 25, 34, 35 of the first sensing IC 20 and the second sensing IC 30 are passed through the through holes 16 defined by the circuit substrate 12 and are inserted into the holes 15 of the housing cover 10. Then, the first leads 23, 33 and the second leads 24, 25, 34, are electrically coupled with the circuit substrate 12, for example, by laser irradiation.

Figure 10:
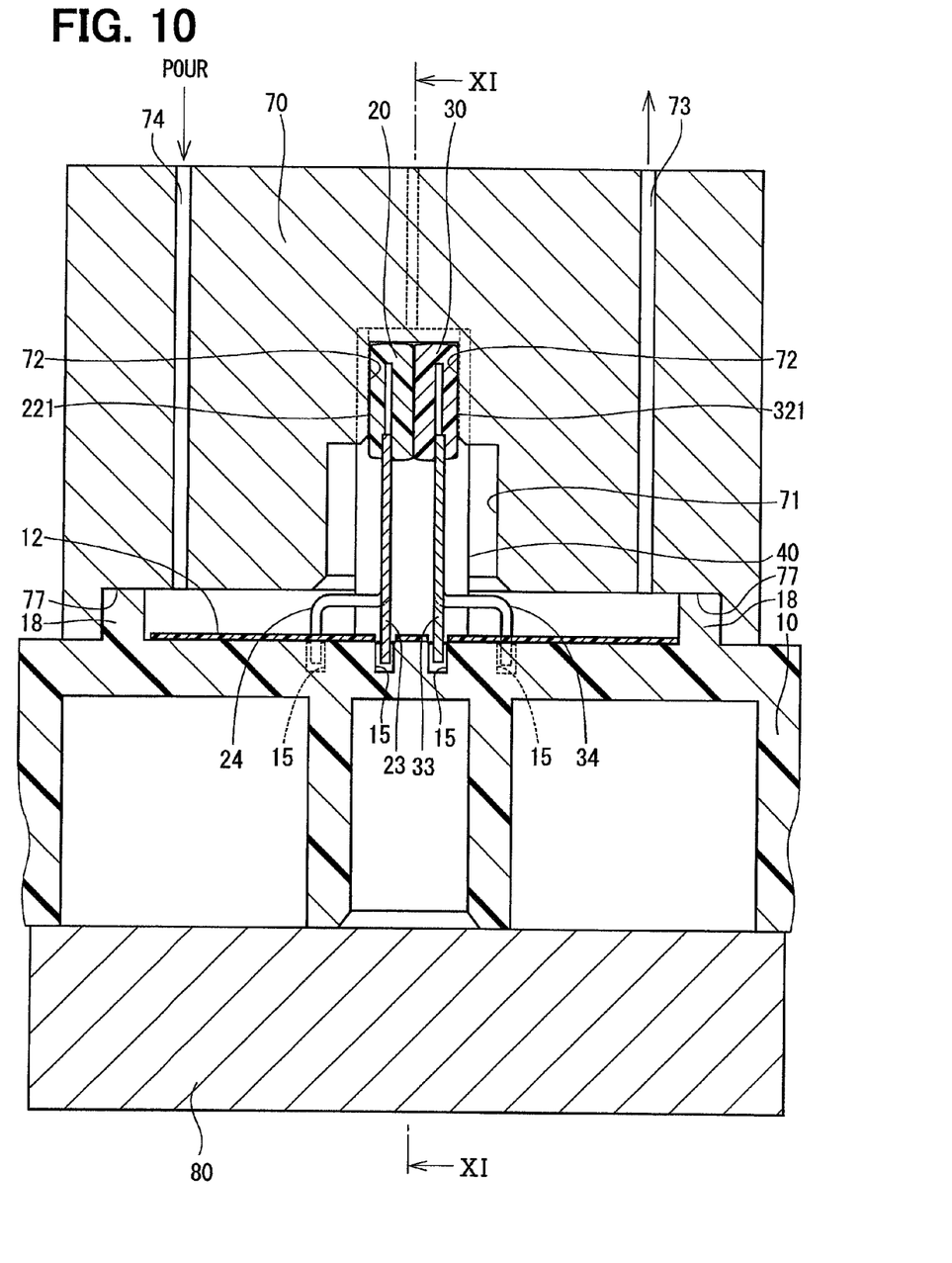
FIG. 10 is a diagram showing a manufacturing process of the rotation angle sensor according to the first embodiment.
Figure 11:
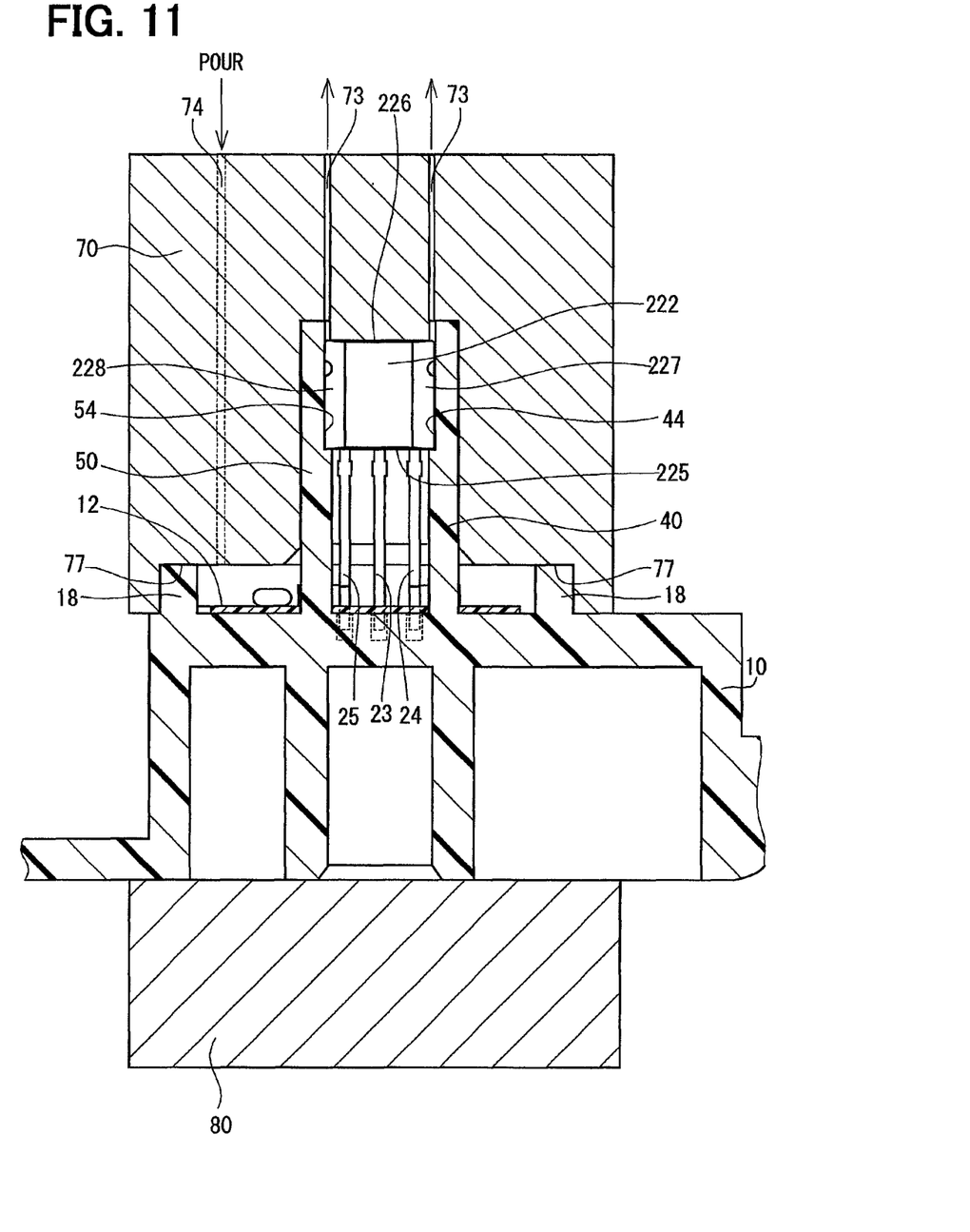
FIG. 11 is a cross-sectional view showing the manufacturing process of the rotation angle sensor taken along line XI-XI in FIG. 10.

Next, as shown in FIG. 10 and FIG. 11, the housing cover 10 is interposed between a metal mold 70 and a base 80. The metal mold 70 may be made of, for example, aluminum. An end surface 77 of the metal mold 70 adjacent to the housing cover 10 comes into contact with the upper surface of the surrounding wall 18. The metal mold 70 closes the opening portion 19 of the surrounding wall 18. The metal mold 70 includes a cylindrical portion 71 at a portion between the positions where the magnetism detection elements 21, 31 are buried and the housing cover 10. The metal mold 70 further includes a flat portion 72 that comes into contact with the front surface 221 of the molded body 22 at the position where magnetism detection element 21 is buried. The flat portion 72 protrudes inward from the cylindrical portion 71. The metal mold 70 defines a plurality of air vents 73.

Next, melt resin is poured from an inlet 74 of the metal mold 70. For example, the resin may be thermoplastic resin or thermosetting resin. The resin is poured to seal the circuit substrate 12 and the second leads 24, 25, 34, 35 inside the surrounding wall 18 and to form the circuit sealing portion 62 and the taper portion 63. Then, the melt resin is poured along the cylindrical portion 71 of the metal mold 70 to form the IC supporters 61. Furthermore, the melt resin is poured among the chamfered portions 227, 327, 223, 328 to form the coupling portions 64. The melt resin is also poured in the first depression 44 and the second depression 54 between the upper surfaces of the molded bodies 22, 32 and the upper surface of the first pillar 40 to form the stopper portions 65. Accordingly, the circuit sealing portion 62, the IC supporters 61, the coupling portions 64, and the stopper portions 65 are integrally formed. After the melt resin hardens, the metal mold 70 and the base 80 are detached from the housing cover 10. Accordingly, the resin body 60 is formed. The housing cover 10 to which the circuit substrate 12, the first pillar 40 and the second pillar 50 are provided, the first sensing IC 20, and the second sensing IC 30 fix the resin body 60. Subsequently, the housing cover 10 is attached to the housing 3 and the rotation angle sensor 1 is manufactured.

For example, the rotation angle sensor 1 according to the present embodiment can achieve the following effects.

The resin body 60 seals the molded bodies 22, 32 located between the magnetism detection elements 21, 31 and the housing cover 10, the leads 23, 24, 25, 33, 34, 35, and the circuit substrate 12. The front surfaces 221, 321, and the rear surfaces 222, 322 of the molded bodies 22, 32, which corresponds to the positions where the magnetism detection elements 21, 31 are buried, are exposed from the resin body 60. Thus, when the temperature of the rotation angle sensor 1 changes, a stress applied from the resin body 60 to the magnetism detection elements 21, 31 can be reduced. Therefore, temperature characteristics of the rotation angle sensor 1 are stable, and the rotation angle sensor 1 can have a high detection accuracy.

The forming stress applied to the magnetism detection elements 21, 31 during manufacture of the rotation angle sensor 1 can be reduced. Therefore, a process for checking a damage of the magnetism detection elements 21, 31 due to the forming stress can be omitted, and a manufacturing cost can be reduced.

The first depression 44 of the first pillar 40 locks the molded bodies 22, 32 outside the position where the magnetism detection element 21 is buried. The second depression 54 of the second pillar 50 locks the molded bodies 22, 32 outside the position where the magnetism detection element 21 is buried. Accordingly, when the temperature of the rotation angle sensor 1 changes, stresses applied from the first pillar 40 and the second pillar 50 to the magnetism detection element 21 can be reduced. The first sensing IC 20, the second sensing IC 30, and the housing cover 10 are positioned with accuracy. Thus, the detection accuracy of the rotation angle sensor 1 can be improved.

The first leads 23, 33 extends perpendicularly from the molded bodies 22, 32 toward the housing cover 10, pass through the through holes 16 defined by the circuit substrate 12, and are inserted into the holes 15 defined by the housing cover 10. Accordingly, the first sensing IC 20, and the second sensing IC 30 are disposed approximately perpendicularly to the inner wall of the housing cover 10 to which the circuit substrate 12 is attached.

The second leads 24, 25, 34, 35 pass through the through holes 16 defined between the first pillar 40 and the second pillar 50 by the circuit substrate 12 and are inserted into the holes 15 of the housing cover 10. Accordingly, an area to which the solder for coupling the circuit substrate 12 and the second leads 24, 25, 34, 35 is applied can be increased. Thus, electrical continuities of the second leads 24, 25, 34, 35 can be secured.

The housing cover 10 is integrated with the surrounding wall 18 that is provided outside the circuit substrate 12. Accordingly, in the manufacture of the rotation angle sensor 1, when the circuit substrate 12 is sealed with the melt resin for forming the resin body 60, the surrounding wall 18 can restrict the melt resin from leaking to the outside of the circuit substrate 12.

The resin body 60 includes the IC supporters 61 disposed on the extension lines of the arcs of the outer wall 41 of the first pillar 40 and the outer wall 51 of the second pillar 50. Accordingly, a space defined between the first sensing IC 20 and the second sensing IC 30, and the magnets 8 and the yokes disposed radially-outside thereof can be effectively used, and volumes of the first pillar 40, the second pillar 50, and the resin body 60 can be increased. Therefore, the first sensing IC 20 and the second sensing IC 30 can be fixed to the housing cover 10 with certainty.

The resin body 60 further includes the stopper portions 65. The stopper portions 65 are located in the first depression 44 of the first pillar 40 and the second depression 54 of the second pillar 50 and seal the upper surfaces of the molded bodies 22, 32. The stopper portions 65 can restrict the first sensing IC 20 and the second sensing IC 30 from falling out from the first pillar 40 and the second pillar 50 to the throttle valve 2.

In the resin body 60, the circuit sealing portion 62, the taper portions 63, the IC supporters 61, the coupling portions 64, and the stopper portions 65 are integrally formed. Accordingly, the resin body 60 can be formed in one process, and the manufacturing cost of the rotation angle sensor 1 can be reduced.

Second Embodiment

Figure 12:
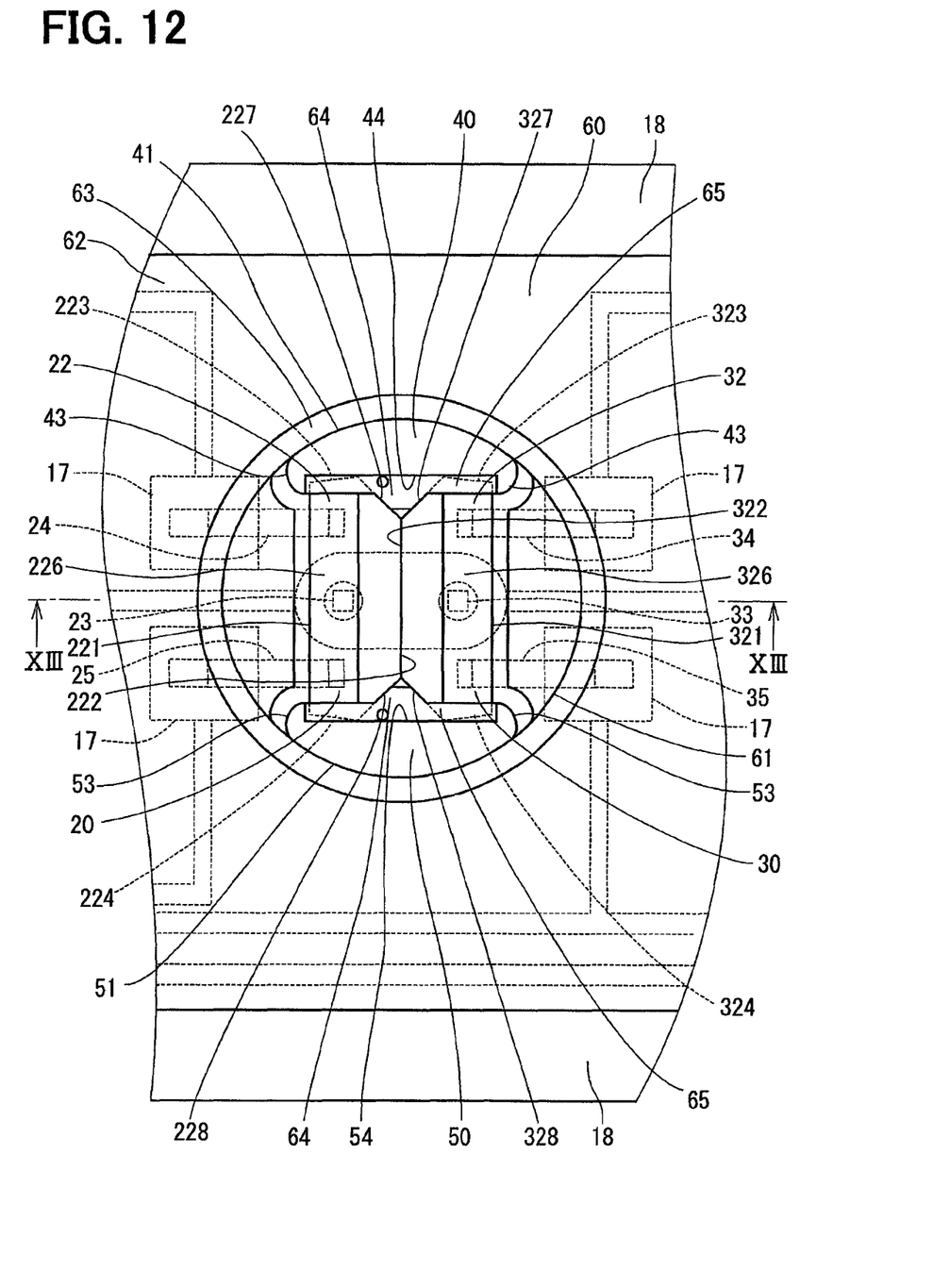
FIG. 12 is an enlarged view of a portion of a rotation angle sensor according to a second embodiment of the present disclosure.
Figure 13:
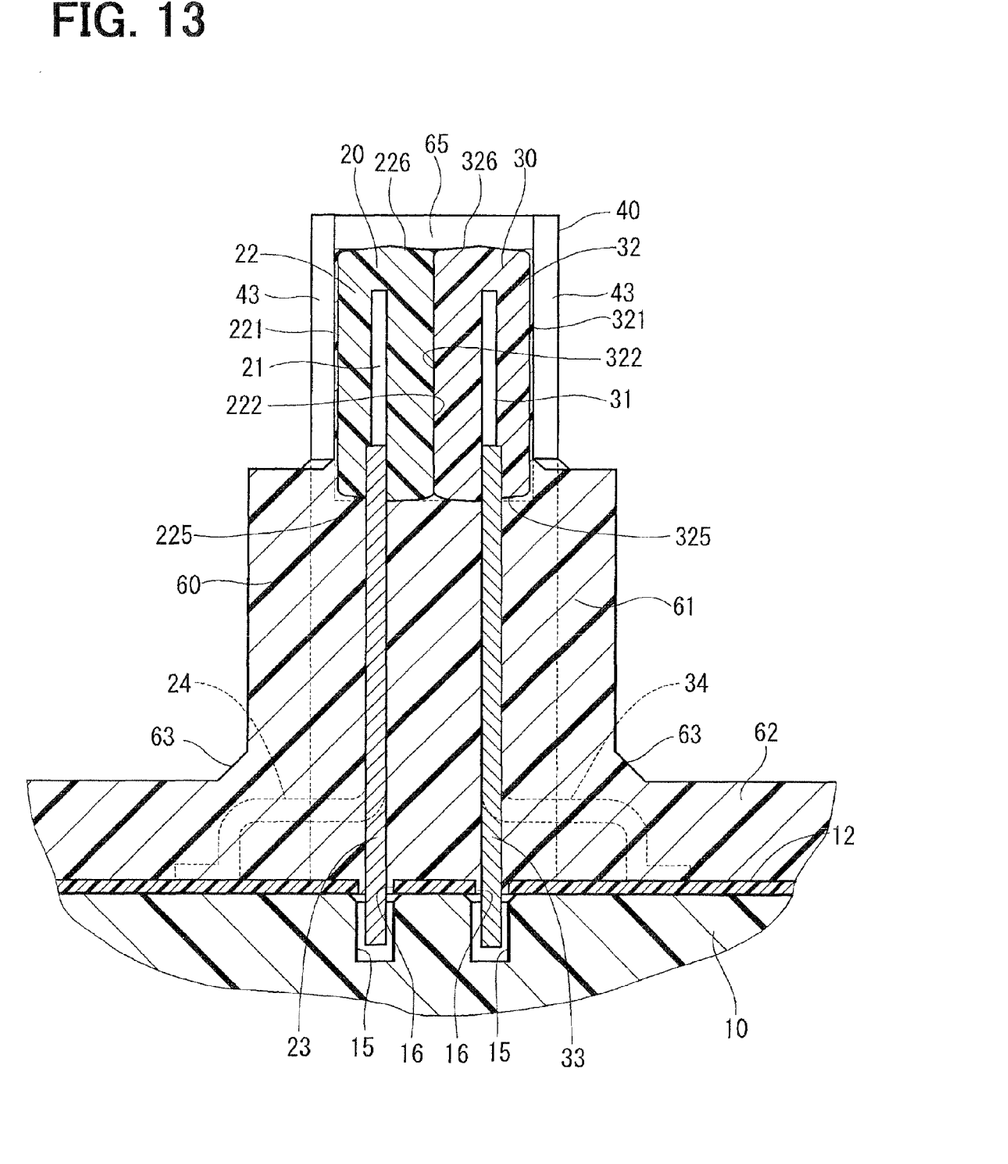
FIG. 13 is a cross-sectional view of the portion of the rotation angle sensor taken along line XIII-XIII in FIG. 12.

A rotation angle sensor according to a second embodiment of the present embodiment will be described with reference to FIG. 12 and FIG. 13. In the present embodiment, components substantially similar to the above-described components of the first embodiment are assigned the same reference numerals. In the present embodiment, the second leads 24, 25, 34, 35 protruding from the molded bodies 22, 32 are curved at positions between the upper surface of the surrounding wall 18 and the housing cover 10 and extends to the outside of the first pillar 40 and the second pillar 50. The second leads 24, 25, 34, 35 are further curved to extend perpendicularly to the housing cover 10. Then, the second leads 24, 25, 34, 35 are further curved to extend in parallel with lands 17 of the circuit substrate 12 disposed outside the first pillar 40 and the second pillar 50. The other end portions of the second leads 24, 25, 34, 35 are electrically coupled with the lands 17 of the circuit substrate 12 with solder and the like. The first leads 23, 33 extend from the molded bodies 22, 32 toward the housing cover 10, pass through the through holes 16 defined between the first pillar 40 and the second pillar 50 by the circuit substrate 12, and are inserted into the holes 15 of the housing cover 10. The other end portions of the first leads 23, 33 are electrically coupled with the through holes 16 with solder and the like. In the present embodiment, the second leads 24, 25, 34, 35 can be electrically coupled with the lands 17 with certainty regardless of manufacturing tolerances in the curving process of the second leads 24, 25, 34, 35.

Third Embodiment

A rotation angle sensor according to a third embodiment of the present disclosure will be described. In the present embodiment, the resin body 60 is made of two-liquid hardening resin. The two-liquid hardening resin may include epoxy resin. In the present embodiment, melt two-liquid hardening resin is mixed and is poured into the metal mold 70. After the two-liquid hardening resin hardens, the housing cover 10 is removed from the metal mold 70. Accordingly, the resin body 60 can be formed in a short time.

Fourth Embodiment

A rotation angle sensor according to a fourth embodiment of the present disclosure will be described. In the present embodiment, the resin body 60 is made of ultraviolet-ray hardening resin. Melt ultraviolet-ray hardening resin is poured into the metal mold 70 that is made of transparent material. The ultraviolet-ray hardening resin is irradiated with an ultraviolet ray from outside the metal mold 70. After the ultraviolet-ray hardening resin hardens, the housing cover 10 is removed from the metal mold 70. Accordingly, the resin body 60 can be formed in a short time.

Fifth Embodiment

A rotation angle sensor according to a fifth embodiment of the present disclosure will be described. In the present embodiment, the resin body 60 is made of hot melt resin. The hot melt resin, which is melted by heating, is poured into the metal mold 70. After the hot melt resin is cooled and hardens, the housing cover 10 is removed from the metal mold 70. Accordingly, the resin body 60 can be simply formed in a short time without mixing two liquid or irradiating with an ultraviolet ray.

Other Embodiments

In each of the above-described embodiment, the rotation angle sensor is configured to detect the rotation angle of the throttle valve 2 as the detected object. The rotation angle sensor may also be configured to detect a rotation angle of a rotation shaft of an acceleration pedal, a crankshaft, and the like. While the present disclosure has been described with reference to the foregoing embodiments, it is to be understood that the disclosure is not limited to the embodiments and constructions. The present disclosure is intended to cover various modification and equivalent arrangements.

What is claimed is:

1. A rotation angle sensor comprising:
a housing;
a detected object rotatably held by the housing;
a magnetism generation section provided to the detected body and configured to generate a magnetic field whose magnetic flux flows perpendicularly to a rotation axis of the detected object;
a housing cover attached to a side of the housing adjacent to the magnetism generation section;
a circuit substrate attached to the housing cover;
a sensing IC including a magnetism detection element, a molded body, and a plurality of leads, the magnetism detection element configured to output a signal in accordance with a change in the magnetic field due to a rotation of the detected object, the molded body covering the magnetism detection element, one end portion of each of the plurality of leads electrically coupled with the magnetism detection element and the other end portion of each of the plurality of leads protruding from the molded body and electrically coupled with the circuit substrate; and
a resin body sealing a portion of the molded body located between the magnetism detection element and the housing cover, the plurality of leads, and the circuit substrate.

2. The rotation angle sensor according to claim 1, wherein the resin body is formed by pouring melt resin to seal the portion of the molded body located between the magnetism detection element and the housing cover, the plurality of leads, and the circuit substrate and hardening the melt resin.

3. The rotation angle sensor according to claim 1, wherein the resin body is made of hot melt resin.

4. The rotation angle sensor according to claim 1, wherein the resin body is made of two-liquid hardening resin.

5. The rotation angle sensor according to claim 1, wherein the resin body is made of ultraviolet-ray hardening resin.

6. The rotation angle sensor according to claim 1, further comprising a first pillar and a second pillar extending from the housing cover toward the magnetism detection element, wherein:
the molded body has a rectangular parallelepiped shape and includes a front surface, a rear surface, two side surfaces, a lower surface, and an upper surface;
the front surface and the rear surface are parallel to the magnetism detection element;
the two side surfaces are located between the front surface and the rear surface;
the plurality of leads protrudes from the lower surface;
the upper surface is opposite the lower surface;
the first pillar locks one of the side surfaces of the molded body outside a position where the magnetism detection element is buried; and
the second pillar locks the other of the side surfaces of the molded body outside the position where the magnetism detection element is buried.

7. The rotation angle sensor according to claim 6, wherein:
the first pillar defines a first depression that is depressed radially-outward of the rotation axis of the detected object;
the second pillar defines a second depression that is depressed radially-outward of the rotation axis of the detected object; and
the molded body is locked between an inner wall of the first depression and an inner wall of the second depression.

8. The rotation angle sensor according to claim 6, wherein the plurality of leads includes a first lead and a second lead, and
one end portion of the first lead is electrically coupled with the magnetism detection element and the other end portion of the first lead passes through a through hole defined between the first pillar and the second pillar by the circuit substrate and is inserted into a hole defined by the housing cover.

9. The rotation angle sensor according to claim 8, wherein one end portion of the second lead is electrically coupled with the magnetism detection element and the other end portion of the second lead passes through another through hole defined between the first pillar and the second pillar by the circuit substrate and is inserted into another hole defined by the housing cover.

10. The rotation angle sensor according to claim 8, wherein the circuit substrate has a land outside the first pillar and the second pillar, and
one end portion of the second lead is electrically coupled with the magnetism detection element and the other end portion of the second lead extends in parallel with the circuit substrate and is electrically coupled with the land.

11. The rotation angle sensor according to claim 6, wherein each of the first pillar and the second pillar has an outer wall that has a shape of an arc centering on the rotation axis of the detected object, and
the resin body includes IC supporters disposed on extension lines of the arcs of the outer walls of the first pillar and the second pillar.

12. The rotation angle sensor according to claim 11, wherein
the resin body includes stopper portions disposed in the first depression of the first pillar and the second depression of the second pillar and lock the upper surface of the molded body.

13. The rotation angle sensor according to claim 12, wherein:

the sensing IC includes a first sensing IC and the second sensing IC disposed between the first pillar and the second pillar;

the rear surface of the first sensing IC is opposite the rear surface of the second sensing IC;

each of the first sensing IC and the second sensing IC includes chamfered portions between the rear surface and the side surfaces;

the resin body further includes coupling portions disposed between the chamfered portions of the first sensing IC and the chamfered portions of the second sensing IC, and coupling the IC supporters and the stopper portions.

14. The rotation angle sensor according to claim 13, further comprising a surrounding wall extending from the housing cover toward the detected object and located outside the circuit substrate, wherein the resin body further includes a circuit sealing portion disposed inside the surrounding wall and sealing the circuit substrate, and the circuit sealing portion, the IC supporters, the coupling portions and the stopper portions are integrally formed.

* * * * *